United States Patent [19]

Chalmers et al.

[11] Patent Number: 5,668,802
[45] Date of Patent: Sep. 16, 1997

[54] HIGH-SPEED DIGITAL SUBSCRIBER LINES

[75] Inventors: David Christopher Chalmers, Middlesex; Frederick Michael Clayton, Bedfordshire, both of United Kingdom

[73] Assignee: GPT Limited, United Kingdom

[21] Appl. No.: 334,938

[22] Filed: Nov. 7, 1994

[30] Foreign Application Priority Data

Nov. 11, 1993 [GB] United Kingdom .................. 9323337

[51] Int. Cl.$^6$ .................. H04J 11/00; H04J 4/00
[52] U.S. Cl. .................. 370/276; 370/281; 370/295; 370/480; 370/525; 375/275
[58] Field of Search .................. 375/219, 220, 375/222, 257, 275, 280, 267; 370/24, 29, 30, 94.1, 276, 281, 295, 480, 484, 525, 526, 536

[56] References Cited

U.S. PATENT DOCUMENTS

| 4,438,511 | 3/1984 | Baran | 370/16 |
| 4,864,564 | 9/1989 | Parker et al. | 370/94.1 |
| 5,317,596 | 5/1994 | Ho et al. | 375/232 |

FOREIGN PATENT DOCUMENTS

WO 8503180  8/1985  WIPO.

OTHER PUBLICATIONS

European Transactions On Telecommunications And Related Technologies, Col. 4, No. 3, May 1993, pp. 257–266, Peter S. Chow, et al., *A Multicarrier E1–HDSL Transceiver System with Coded Modulation.*

IEEE International Conference On Communications 1993, 26 May 1993, pp. 772–776, Minnie Ho, et al., *High–Speed Full–Duplex Echo Cancellation For Discrete Multitone Modulation.*

*Primary Examiner*—Wellington Chin
*Assistant Examiner*—Jean B. Corrielus
*Attorney, Agent, or Firm*—Kirschstein, et al.

[57] ABSTRACT

A communications system employs a high-speed digital link with discrete multiple tone (DMT) the outward paths from a central transmitter/receiver to further transmitter/receivers receiving signals therefrom using one set of carrier frequency channels and the return signal paths using a different set of carrier frequency channels.

In one form the central transmitter/receiver is an exchange and the further transmitter/receivers are subscribers connected to the exchange.

14 Claims, 2 Drawing Sheets

HIGH-SPEED DIGITAL SUBSCRIBER LINES

BACKGROUND OF THE INVENTION

1. Field of the Invention

For the past few years there has been interest in transmitting and receiving high-speed data over telephone wires to individual subscribers without having to provide higher-quality cables. High speed in this context means rates such as 1.5 Mb/s (U.S.A.), 2 Mb/s (Europe). Two systems have emerged:

1) High-speed digital subscribers line (HDSL). The equipments at each end of the line are nominally indentical. They transmit and receive data simultaneously at the same rates, i.e., full duplex. It is expected that two or three lines will be needed to achieve the desired capacity, each signalling at 50% or 33% respectively relative to a single-line implementation.

2) Asymmetric digital subscribers line (ADSL). On the basis that most subscribers do not have the means or the need to generate such large amounts of data, the channel from subscriber to exchange is reduced to a low-speed signalling circuit, typically 16 kb/s, while retaining a high-speed channel from exchange to subscriber. An obvious application for this is the transmission of a selectable broadcast-quality video signal. An ADSL system has a much longer transmission range than an HDSL system of the same baud rate as will be discussed later.

Transmission standards are still under discussion. For HDSL the main contenders are pulse-amplitude modulation, probably 2B1Q as used on ISDN, or Quadrature Amplitude Modulation (QAM) (and a recent variant termed carrierless amplitude/phase modulation (CAP). For ADSL it is most likely that the American National Standards Institute (ANSI) will specify discrete multiple tone (DMT).

DMT is fully described in tutorial paper T1E1.4/91-157 "A Multicarrier Primer" J. M. Cioffi, Amati Communications Corporation presented to Standards Committee T1-Telecommunications, of ANSI and imported herein by reference, but its basic principle is as follows:

Successive blocks of the high-speed data stream are demultiplexed into a large number of channels (typically 256). Each channel may be several bits wide and different channels may be of different widths. Each channel is then QAM-modulated on to one of 256 cariers. The carrier frequencies are all harmonics of the lowest one. This composite spectrum is transmitted for the duration of the data block length. Viewed another way, each subset of bits within the data block describes the amplitude and phase of a tone burst at a frequency specific to that group. The tone burst lasts for a data-block duration, and the tones are a simple harmonic series (FIGS. 1 & 2).

The claimed advantages of DMT lie not so much in its transmission performance or distance under normal conditions but in its implementation and flexibility: (a) the composite spectrum is generated and decoded by a fast Fourier transform (FFT) and its inverse, without the need for generating individual carriers; (b) since each carrier occupies a small bandwidth it suffers little frequency distortion so removing the need for complicated line equalizers; (c) by monitoring the error rate of each carrier, the receiver can instruct the transmitter to preferentially use those parts of the spectrum with the best performance.

HDSL is limited by near-end crosstalk (NEXT). To the attenuated signal from the distant transmitter is added an unwanted signal that originates from transmitters physically close to the receiver and which is coupled via inter-wire capacitance. With conventional coding, the wanted signal and the NEXT occupy the same frequencies. The problem is greater at the exchange end where lines are concentrated than it is at the subscriber's end.

With ADSL the subscriber's receiver only receives NEXT from low-speed sources so the limiting factor is noise from unwanted high-speed transmitters at the exchange (far-end crosstalk). The noise source is thus the same as for HDSL but the noise is attenuated by the line given an ADSL system better Signal/Noise ratio (SNR).

In full-duplex operation the received signal may contain an element of the signal transmitted on the same wire-pair that is caused by impedance discontinuities in the transmission medium or imbalance in a hybrid circuit. In many data systems it is necessary to include an echo canceller to remove this interfering signal.

SUMMARY OF THE INVENTION

According to the present invention there is provided a communications system employing a high-speed digital link with discrete multiple tone (DMT) wherein the outward paths from a central transmitter/receiver to further transmitter/receivers receiving signals therefrom use one set of carrier frequency channels and the return signal paths use a different set of carrier frequency channels.

The communications system may be a telecommunications system, wherein the central transmitter/receiver is an exchange and the further transmitter/receivers are subscribers connected to the exchange.

BRIEF DESCRIPTION OF THE DRAWINGS

The present invention will now be described by way of example, with reference to the accompanying drawings, in which.

DETAILED DESCRIPTION OF THE INVENTION

While the present invention is described with reference to systems using copper wire-pairs, the invention has general applicability to any arrangement where the signals from co-sited transmitters can interfere with one another, for example, infra-red links within a room or in close proximity to one another.

Figure 1:
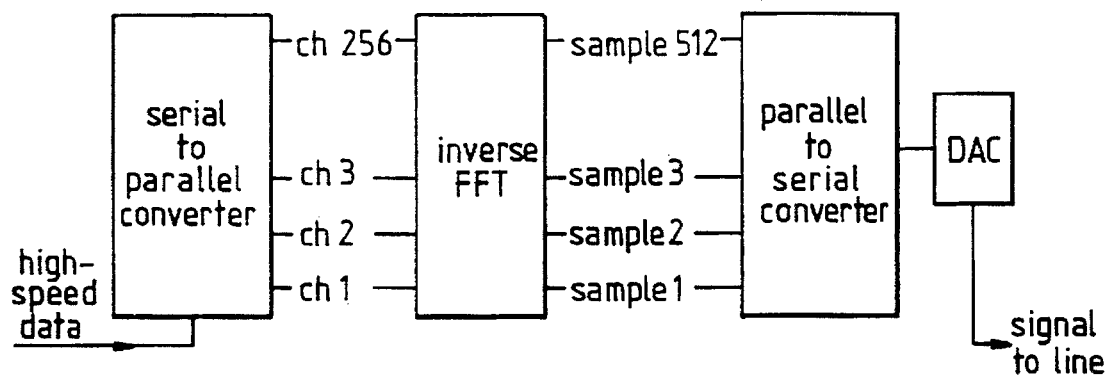
FIG. 1 shows a diagrammatic representation of a DMT transmitter coder.
Figure 2:
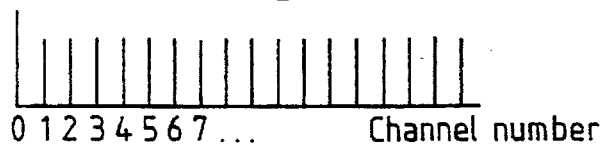
FIG. 2 shows a conventional arrangement of DMT 'go' and 'return' channels.
Figure 3:
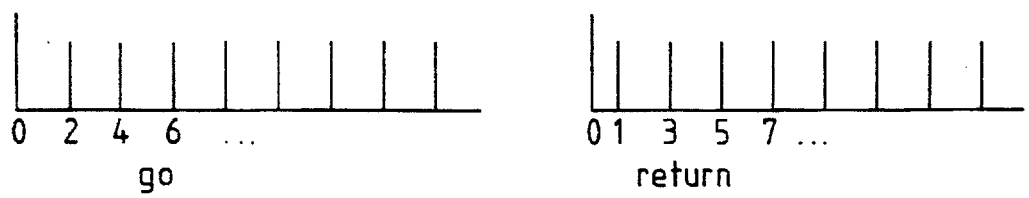
FIGS. 3 and 4 show possible arrangements of DMT 'go' and 'return' channels according to the present invention.
Figure 5:
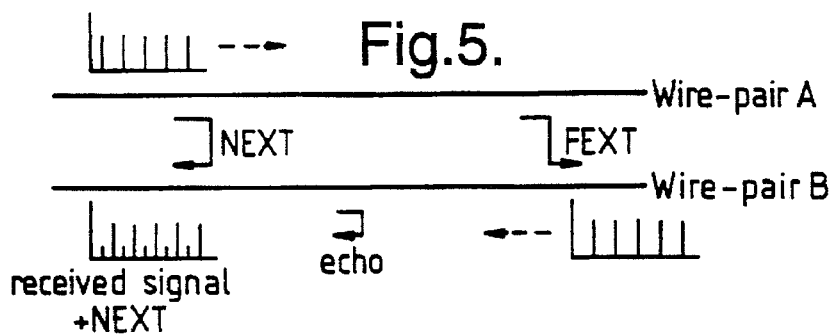
FIG. 5 shows diagrammatically the forms of crosstalk in a telecommunications system according to the present invention.

In an HDSL system using DMT wherein all routes from exchange to subscribers use one set of carrier frequencies and the routes from subscribers to exchange use a different set, NEXT and echos occupy different frequencies from the desired received signal (FIGS. 3, 5). At first sight it would appear that a comb filter would be needed to remove the NEXT before the signal is applied to the FFT, but it is simpler to omit the filter; the noise then appears as small signals at those outputs from the FFT that correspond to the interfering carriers. Since it is known that the transmitter does not use those channels, the noise may simply be ignored.

With NEXT eliminated the limiting factor becomes far-end crosstalk (FEXT) as with ASDL. A penalty of at least 3 dB exists relative to ADSL since the data rate applied to each carrier must be doubled, but the performance should greatly exceed HDSL using Phase Amplitude Modulation (PAM) or QAM.

For a signal to be properly detected the receiver FFT function must be carried out on the correct block of data. If the FFT window is not aligned with the data block then data from an adjacent frame will be included while data from the correct frame will be omitted. Truncating the frame in this way causes harmonic distortion of the received signal and hence a transfer of signal from one carrier frequency to another. The crosstalk component of a received signal will therefore only be fully suppressed if the FFT operation is synchronised with the crosstalk. In general this will be inconsistent with synchronizing with the received data, and to overcome this drawback it is necessary to adjust the relative delay between the crosstalk and the received frame.

Figure 6:
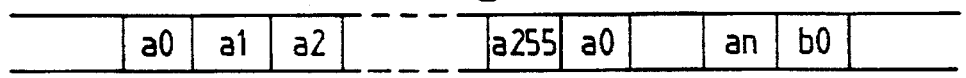
FIG. 6 shows diagrammatically an n-sample post-cursor attached to a 256-sample data frame.
Figure 7:
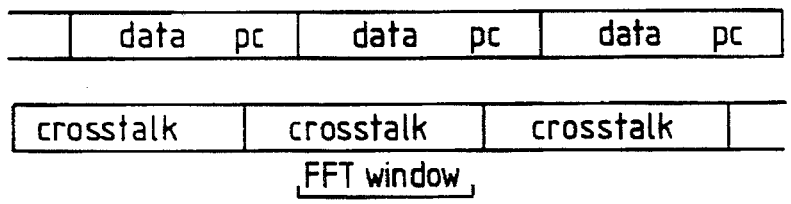
FIG. 7 illustrates the alignment of data and post-cursor with crosstalk.
Figure 8:
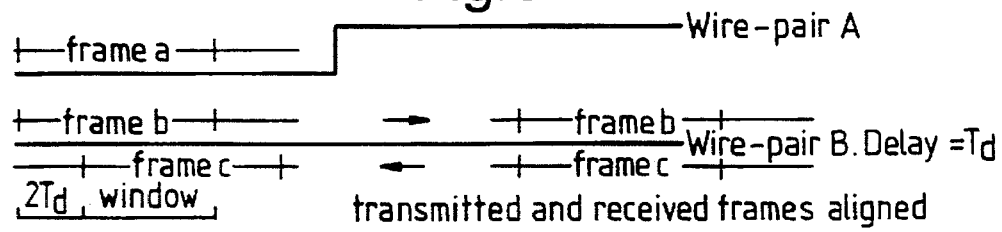
FIGS. 8 and 9 illustrate the alignment of transmitted data according to two alternative methods.

The phase of a data frame can be adjusted provided all or part of the frame is repeated. If the first M samples of an N-sample frame are appended to the frame as a post-cursor, then the last N samples of the new frame are a rotated form of the original and can be demodulated without adding distortion (FIGS. 6, 7); the only effect is to add a time-delay. If the duration of the M samples equals or exceeds twice the propagation delay of the cable and the frames are correctly aligned then NEXT will be properly suppressed; note that all co-sited transmitters must be synchronized for their crosstalk to be cancelled. Referring to FIG. 8, frame b is transmitted to a subscriber with a delay $T_d$. The subscriber's frame c is transmitted in synchronism with the locally-received data and arrives at the exchange with a total delay of $2T_d$. To c is added the crosstalk from frame a on a nearby wire-pair. The window for the FFT function performed on received frame c starts at the beginning of frame c and includes the last part of crosstalk frame a and the beginning of its post-cursor. When an FFT is performed on the noisy signal there is no transference of crosstalk energy from one carrier frequency to another and the crosstalk is rejected. Note that the length M of the post-cursor must be the same for all transmitters. Regarding echoes, a reflection from the hybrid at the transmitter will be suppressed, but echoes originating further down the line may not be aligned with crosstalk frame a and will leak through.

This method of synchronization is only possible at one end of the line. It should therefore be used at the exchange, where the crosstalk is greater (i.e., alignment of the transmitted and received frames should be carried out at the subscriber's end).

NEXT at the subscriber's end will arise where the cable converges with those from other subscribers; it will be subject to a certain amount of cable attenuation and it will be advanced or retarded relative to the received signal depending on the various cable lengths. Since the post-cursor is designed for the longest possible delay, advanced crosstalk can always be removed but retarded crosstalk requires the use of a precursor in a similar fashion to that described previously. However, DMT may be implemented using a precursor so further coding may not be needed.

Figure 9:
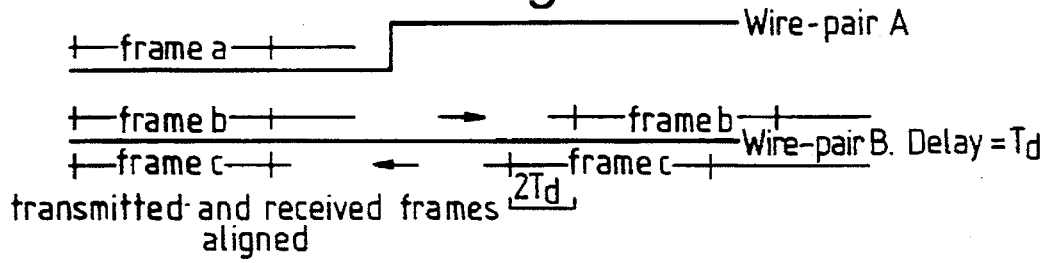

The frames transmitted from and received by the exchange may be synchronized by a second method not requiring a post-cursor. Instead of the subscriber's equipment maintaining its transmitted and received frames in complete alignment it may advance the transmissions by time $2T_d$ thereby compensating for the cable delay (FIG. 9). It is necessary for the exchange to inform the subscriber's equipment of the amount of slip required, which might be achieved by either of the following:

1) the subscriber sending a repeated alignment frame. The exchange computes the required slip and informs the subscriber accordingly.

2) the exchange detecting that the subscriber's data cannot be satisfactorily demodulated and sending a command 'slip' until the correct delay is reached.

Each time the subscriber's equipment receives 'slip' it adjusts the alignment of its transmissions by a suitable increment.

The measure of the cable delay, together with other information such as the state of an adaptive equalizer and the optimum assignment of data among the various channels, may be stored in the receiver between calls to reduce the set-up time.

Figure 4:

Regarding channel selection, the most obvious implementation is to use the even-numbered channels for one path and the odd channels for the other. However, they may be grouped in any way that gives adequate capacity (e.g., FIG. 4). In the limit, one path uses all the high channels and the other all the low channels which is then similar to V22bis standard for data modem operation. Further, the system may be made asymmetric by allocating more channels to one path than the other.

What we claim is:

1. A communications system employing a high-speed digital link with discrete multiple tone (DMT) modulation, comprising:

a plurality of outward paths from a central transmitter/receiver to further transmitter/receivers receiving signals therefrom, each of the outward paths using one set of carrier frequency channels;

a plurality of return signal paths from the further transmitter/receivers to the central transmitter/receiver, each of the return paths using a different set of carrier frequency channels; and said carrier frequency channels being arranged in a sequence in the frequency domain, and alternate channels in said sequence being allocated to the outward and return paths respectively.

2. The communications system as claimed in claim 1, wherein the outward and return paths have differing numbers of the channels allocated thereto.

3. The communications system as claimed in claim 1, wherein an N-sample frame has its first M samples repeated and appended to the frame as a post-cursor, and its last N samples of the frame so formed are demodulated.

4. The communications system as claimed in claim 3, wherein the M samples have a duration which is equal to, or exceeds twice, a propagation delay of the outward path between the central transmitter/receiver and the further transmitter/receivers.

5. The communications system as claimed in claim 1, wherein transmitted frames are advanced in time on received frames.

6. The communications system as claimed in claim 5, wherein a further transmitter/receiver transmits a repeated alignment frame from which the central transmitter/receiver computes the necessary advance in time which is transmitted to the further transmitter/receiver.

7. The communications system as claimed in claim 5, wherein the central transmitter/receiver includes detector means for detecting signals transmitted by a further transmitter/receiver, that cannot be demodulated and, upon detection, transmits a slip command to the further transmitter/receiver.

8. The communications system as claimed in claim 10, wherein the central transmitter/receiver forms part of an exchange, and wherein the further transmitter/receivers form part of subscriber equipment connected to the exchange.

9. A communications system employing a high-speed digital link with discrete multiple tone (DMT) modulation, comprising:
- a plurality of outward paths carrying transmitted data from a central transmitter/receiver to further transmitter/receivers, each of the outward paths using one set of carrier frequency channels;
- a plurality of return signal paths from the further transmitter/receivers to the central transmitter/receiver carrying data from the further transmitter/receivers to be received by the central transmitter/receiver, each of the return paths using a different set of carrier frequency channels; and
- said transmitted and received data being in an alignment, and said alignment being based on commands sent by the central transmitter/receiver to the further transmitter/receivers.

10. The communications system as claimed in claim 9, wherein the data is transmitted in frames, and wherein frames transmitted from each further transmitter/receiver are advanced in time on frames received by the further transmitter/receiver.

11. The communications system as claimed in claim 10, wherein each further transmitter/receiver transmits a repeated alignment frame from which the central transmitter/receiver computes the necessary advance in time which is transmitted to the further transmitter/receiver.

12. The communications system as claimed in claim 10, wherein the central transmitter/receiver includes detector means for detecting signals, transmitted by a further transmitter/receiver, that cannot be demodulated and, upon detection, transmits a slip command to said further transmitter/receiver.

13. The communications system as claimed in claim 9, wherein said carrier frequency channels are arranged in a sequence in the frequency domain, and wherein alternate channels in said sequence are allocated to the outward and return paths respectively.

14. The communications system as claimed in claim 9, wherein the central transmitter/receiver forms part of an exchange, and wherein the further transmitter/receivers form part of subscriber equipment connected to the exchange.

* * * * *